United States Patent Office 3,728,245
Patented Apr. 17, 1973

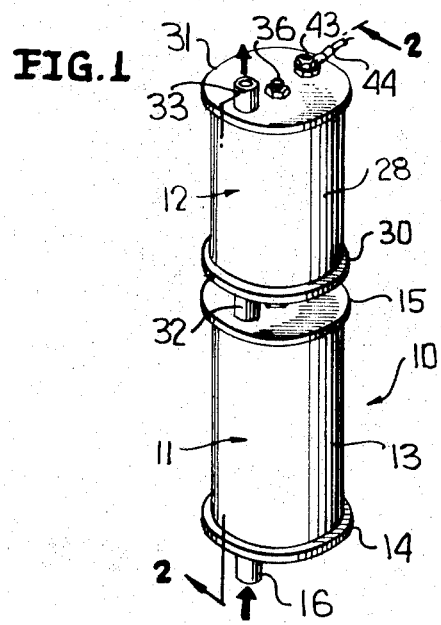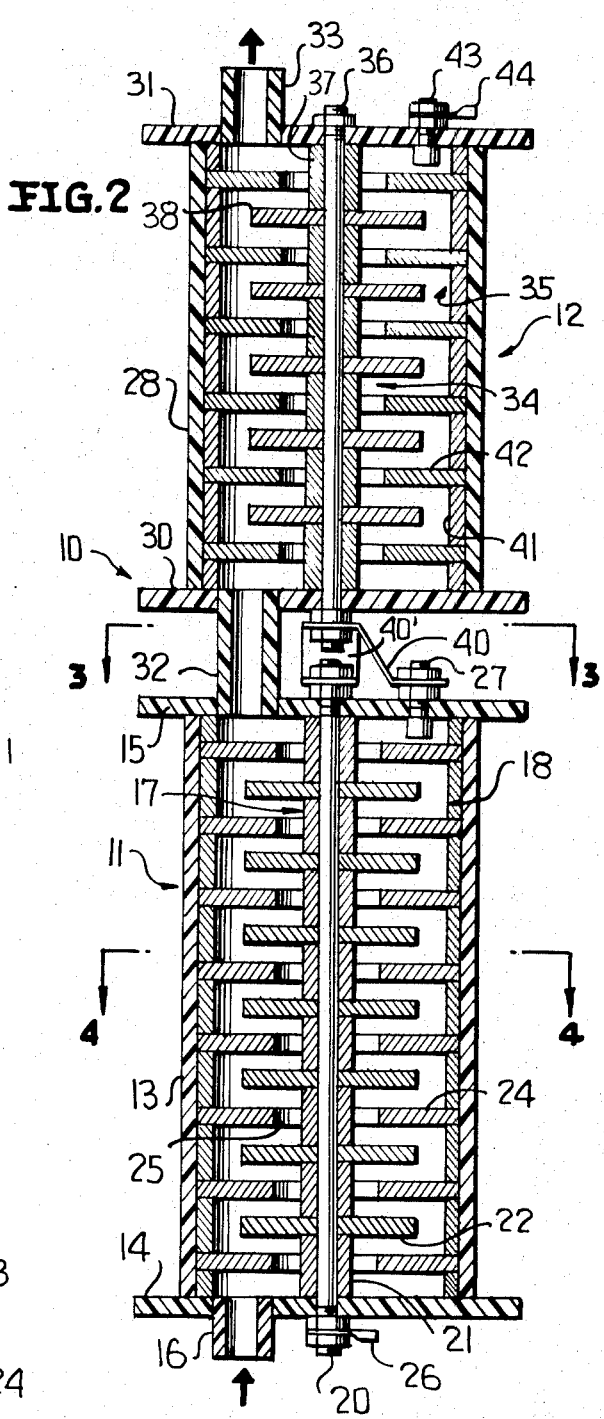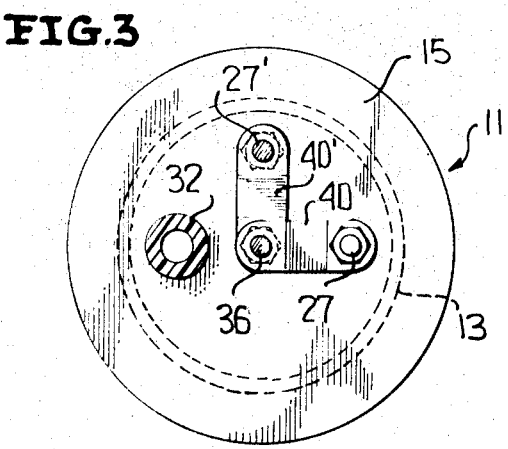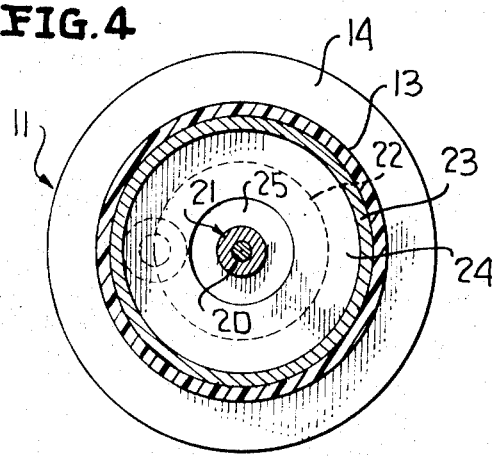

3,728,245
APPARATUS FOR TREATING SEWAGE
William R. Preis, River Edge, and William Cole, Oakland, N.J., assignors to Cole Resedevel Corp., Fairlawn, N.J.
Filed Jan. 13, 1971, Ser. No. 106,162
Int. Cl. C02b 1/82; C02c 5/12
U.S. Cl. 204—275          11 Claims

ABSTRACT OF THE DISCLOSURE

This disclosure relates to an apparatus and method for treating domestic and/or industrial waste water to render the same into a condition for either further reuse in industrial processing or for outflow into natural waters. The treatment utilizes the principles of electrolysis to ionize the water utilizing the sodium of sodium chloride to form sodium hydroxide and the chloride as a bleaching agent. The treatment takes place in a simple two stage cell.

---

This invention particularly relates to a combined sterilization and flocculation cell for treating sewage, waste water and other effluent in a simple and highly efficient manner with the supernatant liquid being of the highest quality.

BACKGROUND OF THE INVENTION

It is well known that the presently available sewage treatment and industrial waste water plants are not only too short in supply to provide adequate treatment of contaminated waters, but also do not operate sufficiently efficiently for the supernatant liquid dispensed therefrom to be freely distributed into natural waters without pollution.

It is also well known that sewage treatment units are relatively bulky and not efficiently useable in many environments.

It is further well known that there are many situations where mobile vehicles are at the present time required to carry holding tanks for sewage which must periodically be pumped into sewage disposal facilities whereas the small portable sewage treatment unit would obviate such holding tanks.

In the past, attempts have been made to purify water by electrolysis. However, these attempts have been primarily limited to the removal of minor impurities from natural waters for the use of the natural water as drinking water.

SUMMARY OF THE INVENTION

In accordance with this invention, it is proposed to treat effluent utilizing the principles of electrolysis which further makes use of one of the inherent qualities which is found in most raw effluents. Waste waters in most cases contain chemical ingredients which can be made to ionize with the help of a direct current electrical charge applied thereto. In the absence of ionizable material in the solution, this may be corrected with the addition of small amounts of sodium chloride which will be largely consumed in the process. In the case of domestic sewage sodium chloride is usually present in sufficient quantities to make it unnecessary for any additive to be used.

In accordance with this invention, a two-stage separator cell is provided. In the first of the two stages, laminar flow of the liquid is effected and electrical energy introduced into the liquid. In the first stage of the cell, the treatment of the effluent results in the separation of certain of the salt and water ions to produce free ions and, through a chemical reaction, sodium hydroxide. The sodium hydroxide causes a breakdown of fatty and oily substances into less complex settleable particles while the oxygen and chloride attack living organisms and colors and odors to cause a bleaching action and to oxidize bacteria and other organic material which is in suspension. In the second stage of the cell, any existing residual ionization is cancelled out with a resultant rapid separation and flocculation of the solids existing in the solution with the aid of certain oxides and chlorides.

The separator cell is of a simple construction and is one which may be readily adapted to a small size which is utilizable on small boats and in house trailers, and at the same time may be produced on a larger scale or in sufficient quantities to handle large treatment requirements.

With the above and other objects in view that will hereinafter appear, the nature of the invention will be more clearly understood by reference to the following detailed description, the appended claims and the several views illustrated in the accompanying drawing:

In the drawing:

FIG. 1 is a perspective view of a separator cell and shows generally the details thereof.

FIG. 2 is an enlarged vertical sectional view taken along the line 2—2 of FIG. 1 and shows specifically the construction of the cell.

FIG. 3 is a transverse sectional view taken along the line 3—3 of FIG. 2.

FIG. 4 is a transverse sectional view taken along the line 4—4 of FIG. 2.

Referring now to the drawing in detail, it will be seen that there is illustrated the details of the separator cell which is the subject of this invention, the separator cell being generally identified by the numeral 10. The separator cell 10 is basically divided into two stages, a first stage 11 and a second stage 12.

The first stage of the separator cell 10 includes a tubular housing 13 which is closed at the opposite ends thereof with closure plates 14 and 15. The closure plate 14, which is at the bottom of the cell 10, is provided with an entrance fitting 16.

Internally, the housing 13 is provided with a central electrode assembly, which is generally identified by the numeral 17, and an outer electrode assembly, which is generally identified by the numeral 18. The electrode assembly 17 and 18 are formed separate and apart and cooperate with one another.

The central electrode assembly 17 includes a bolt 20 which extends the full length of the first stage 11 and projects out through the covers 14 and 15. Between the covers 14 and 15, the bolt 20 is provided in alternating relation with small diameter spacers 21 and circular plates 22, the diameter of the plates 22 being less than the internal diameter of the housing 13. It is preferred that the spacers 21 be formed of the same electrode material as the plates 22.

The external electrode assembly 18 includes rings 23 and plates 24, the plates 24 having large apertures 25 therein. The rings 23 and plates 24 are disposed in alternating relation and are clamped in contacting relation with one another by the covers 14 and 15 which are also in watertight sealed relation with respect to the housing 13.

It is to be noted that the apertures 25 and the plates 24 cooperate with the spacers 21 to provide for a relatively limited flow passage. In a like manner, the plates 22 are spaced from the inner surfaces of the rings 23 a distance to provide for relatively narrow flow passages. In a like manner, the plates 22 and 24 being disposed in alternating relation, provides for relatively narrow flow passages therebetween. As a result, flow of effluent through the stage 11 is substantially a laminar flow. The lower end of the bolt 20 is provided with an electrical connector 26 for connecting the same to a source of electrical energy, the bolt 20 acting as a terminal for the inner electrode assembly 17.

In a like manner, the uppermost ring 23 is provided with a terminal 27 which extends out through the cover 15 and functions as a terminal for the outer electrode assembly 18.

The second stage 12 of the cell 10 is of a like construction with the stage 11, but may be of a greater or shorter length. The stage 12 also includes a cylindrical housing 28 which is sealed at the opposite ends thereof by means of covers 30 and 31. The cover 30, which is lowermost, is connected to the cover 15 of the first stage 11 by means of a non-electrical conducting pipe 32 whereby there is liquid flow between the first stage 11 and the second stage 12 without the two stages of the cell 10 being in electrical conducting connecting one another except through the effluent which flows therebetween. The cover plate 31 is provided with an outlet fitting 33.

The second stage 12, like the first stage 11, is provided with a central electrode assembly 34 and an outer electrode assembly 35. The central electrode assembly 34 includes a bolt 36, small diameter spacers 37, and circular plates 38. The bolt 36 functions as a terminal for the central electrode assembly 34 and is connected to the terminal 27 of the first stage 11 by means of an electrical connector 40. A similar electrical connector 40' extends between the upper end of the bolt 20 to a terminal 27', which corresponds to the terminal 27, and is electrically connected to the outer electrode assembly 35.

The outer electrode assembly 35 includes a plurality of rings 41 and apertured plates 42 which are clamped in contacting relation with one another. The uppermost ring 41 is provided with a terminal 43 which extends through the cover plate 31 and is provided with an electrical fitting 44 which will be connected to a source of electrical energy.

It is to be understood that the construction of the cell 10 has only been schematically illustrated. It is also to be understood that while the cell 10 has been illustrated in a vertical position, and while this is a preferred position of the cell, it is not so limited in usage. However, it is necessary that the cell be full at all times during the operation thereof.

In accordance with this invention, the electrical fittings 26 and 44 will be connected to a source of direct current electrical energy. However, it is feasible that the current may be asymmetrical.

It will be seen from the illustrated constructions of the cell 10 that in each of the two stages there is provided a series of electrically charged plates arranged in close proximity to each other with plates of opposite electrical potential being positioned adjacent each other and parallel to each other. These electrically charged plates are arranged in such a fashion that when the effluent is forced in between them, there is caused to take a most tortuous path in travelling through the length of the cell. This feature assures intimate contact of the entire solution to the electrically charged plate areas and also causes complete mixing throughout the moving solution.

In the first stage 11, the central electrode assembly 17 is the anode, and the outer electrode assembly 18 is the cathode. In the second stage 12, the polarity of electrical charge is reversed and the central electrode assembly becomes the cathode, and the other electrode assembly becomes the anode.

In the preferred embodiment of the invention, the bolts 20 and 36 are formed of brass and the central electrode assemblies have the spacers and plates thereof formed of carbon. The rings and plates of the outer electrode assemblies 18 and 35 are formed of zinc. The choice of carbon and zinc for the electrode assemblies is made to satisfy the needs for the treatment of domestic sewage with a pH in the range of 6 to 8. Other plate materials may be used where the effluent pH dictates their need in order to extend the life of the cell. Some other plate combinations being carbon-platinum, carbon-stainless steel, carbon-mild steel and carbon-carbon. The usable plate life span is directly related to plate material choice and the pH of the solution being treated.

During the operation of the cell 10, the cell plates are charged with low voltage direct current power or asymmetrical current power. The power consumption during operation is directly related to the electrolytic conduction of the solution being treated.

Insofar that many types of effluents may be treated in cells of construction with different plate materials, the mode of operation of the cell will be confined to the description of the aforementioned carbon-zinc cell in connection with the treatment of domestic sewage.

In consideration of the fact that sewage is a very complex mixture, for purposes of clarity, the operation of the cell 10 will be limited to the salt (NaCl) water ($H_2O$) relationship. While the sewage solution is passing through the network of electrically charged plates, some of the sodium chloride and some of the water becomes disassociated and ionized, thereby being free to move about as independent ions throughout the solution. The following free ions are then present with their electrical charges noted:

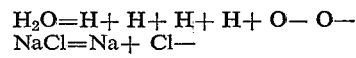

The positive ions of hydrogen and sodium are attracted to the cathode or external electrode 18 and the negative ions of oxygen and chlorine are attracted to the anode or internal electrode assembly 17. After the ions have completed their journey to the anode and cathode, respectively, their charges are nullified and they become free atoms which are ready to combine with other atoms present in the solution in accordance with their valences.

The following action takes place:

One atom of sodium, Na, one atom of oxygen, O, one atom of hydrogen, H, combine to form sodium hydroxide (NaOH) which is als known as lye.

This action leaves one oxygen atom free as nascent oxygen (O), as well as one chlorine atom and three hydrogen atoms free. The hydrogen atoms combine into pairs ($H_2$) and escape from the station as hydrogen gas which may be captioned as a usable byproduct. The nascent oxygen and chlorine, which are quite soluble in water, attack living organisms and colors and odors in the solution to cause a bleaching action and to oxidize bacteria and other organic material which is in suspension.

The sodium hydroxide, which is also soluble in water, causes a breakdown of fatty and oily substances into less complex settleable particles. It is to be understood that the sodium hydroxide neutralizes itself in acting upon other impurities in the effluent being treated.

After passing through the first stage 11, which is the sterilizing part of the treatment, the solution next passes into and flows through the second stage 12 of the cell where an electrical charge of opposite polarity is impressed upon the partially treated solution. This second stage causes any existing residual ionization to cancel out; this, in turn, causing rapid separation and flocculation with the aid of certain oxides and chlorides which are now present in the solution.

After passing through the cell, the resultant solution is fed into a settling basin (not shown) where it is held with very little turbulence for a period of several hours. While in this state, flocculation, with the help of gravity, causes formally suspended colloidal particles to group together in such a manner so as to prevent them from causing future turbity in the solution. After being allowed to settle, the upper portion of the solution becomes a clear and sparkling supernatant liquor, with a small portion of stabilized settleable solids below it. The lower portion which contains the solids may be drawn off and treated in a conventional mannner with a centrifuge or vacuum distilled for a dry sludge which could be salvaged for use as a fuel or fertilizer ingredient.

The resultant clear liquid does have some dissolved salts remaining. These salts are in most cases tolerable for present outfalls without harmful effect on natural ecologies. Through further treatment this water can be rendered re-usable for industry or for potable water supplies, depending upon the local needs.

It is to be understood that the cell 10 may be operated at normal atmospheric pressure for the treatment of domestic sewage. However, where large amounts of harmful bacteria and/or extremely heavy colors or odors are present, it is beneficial to operate the cell 10 at a pressure in the range of 80 to 100 p.s.i. in order to keep the chlorine and ozone in solution for a better bacteria killing and bleaching effect.

It is also apparent that in cases where the raw sewage is to be fed directly into the cell 10 without a holding period, it may be necessary to comminute the sewage so as to facilitate the operation of the cell.

Through actual tests, it has been found that the cell 10 will do the following:

(1) Remove turbidity, which is caused by colloidal suspension by precipitation and flocculation. This produces a supernatant colorless liquid of sparkling quality.

(2) Reduce bacteria count to extremely low levels by the production of nascent oxygen and chlorine.

(3) Remove objectionable colors by the bleaching effects of ozone and chlorine which are produced in liberal quantities in the process.

(4) Cause suspended solids to become settleable to a degree that they will settle out and not remix to cause turbidity with the clear supernatant liquid.

(5) Remove objectionable odors which were formally present in the effluent.

(6) Improve the pH condition where it was formally considered harmful to natural ecologies.

(7) The Biological Oxygen Demand (B.O.D.) requirements were met which makes the end product suitable in this respect for presently established outfall conditions.

(8) The settleable solids were removed after 24 hours of settling to well within the prescribed limits of today's standards for waste water treatment processes.

(9) The finished solutions which were held for several weeks remained stable and odor free.

(10) Our end product will lend itself to membrane filtration insofar that most of the micro-organisims have been killed off. It is the presence of these organisms which have been known to cause membrane fouling which reduces flow rates in that process.

(11) Our process eliminates the need for digesters or trickle filters which are presently used in most sewage treatment facilities.

(12) Due to the simplicity of design our cell takes far less operating space than present facilities which are used to accomplish the same end results.

(13) Compact cell design will lend itself to practical purposes when used for marine sanitary disposal service. The resultant end product is in every way suitable for tidal waters outfall.

(14) Simplicity of design and space requirements make its use practical for use in isolated locations where sewage treatment is required, such as motels, schools or farms.

(15) Fatty and oily substances when present in domestic sewage in normal amounts are broken down chemically and removed through flocculation.

(16) Nitrates and phosphates are reduced in the resultant treated solution, thus reducing over fertilization of outfall waters.

Although only a preferred embodiment of the invention has been specifically illustrated and described herein, it is to be understood that minor variations may be made in the cell construction and operation thereof without departing from the spirit and scope of the invention, as defined by the appended claims.

We claim:

1. A combined sterilization and flocculation cell for treating sewage and other contaminated waters, said cell comprising first and second stages and piping connecting said stages for flow therebetween, means for effecting tortuous generally laminar liquid flow through said stages, and means for effecting controlled electrical current flow to said means for effecting tortuous generally laminar liquid flow and through liquid passing through said stages to ionize the liquid and produce a chemical reaction chemically breaking down the components of the liquid being treated in said first stage and to effect a rapid separation and flocculation of the components of said second stage, said means for effecting controlled electrical current flow includes means for reversing the current flow in said second stage at all times from that in said first stage with any resultant residual ionization from said first stage being cancelled out in said second stage.

2. The cell of claim 1 wherein said current is asymmetrical current.

3. The cell of claim 1 wherein said current is direct current.

4. The cell of claim 1 wherein each of said stages includes an elongated tubular housing and each of said housings having disposed therein said means for effecting generally laminar liquid flow and said means for effecting controlled electrical current flow, which means combined include a central electrode assembly and an outer electrode assembly, each of said electrode assemblies including transverse plates spaced axially of said housing with the plates of said electrodes being alternated and in overlapping relation to thereby provide a maximum current flow through liquid passing between said plates.

5. The cell of claim 4 wherein said stages are connected in series with said outer electrode assembly of one of said stages being connected to said inner electrode assembly of the other of said stages, and the remaining electrode assembly of said stages having terminals for connection to an electrical energy source.

6. The cell of claim 5 wherein said piping is formed of an insulating material to electrically insulate said stages except for the electrical connections therebetween.

7. The cell of claim 1 wherein said stages include an inlet and an outlet, and said stages and said inlet and outlet are arranged in a manner wherein said cell is filled during the operation thereof.

8. The cell of claim 1 wherein each of said stages includes an elongated tubular housing and each of said housings having disposed therein said means for effecting generally laminar liquid flow and said means for effecting controlled electrical current flow, which means combined include a central electrode assembly and an outer electrode assembly, said central electrode assembly including first transverse plates each of an outline less than that of said housing to define an outer flow path between each first transverse plate and the respective housing, and said outer electrode assembly including second transverse plates each generally fitting the respective housing and having a central opening receiving a portion of said central electrode assembly with transverse clearance and defining an inner flow path, said first and second transverse plates being disposed in alternating partially transversely overlapping and axially spaced relation with the flow path of fluid passing through each of said stages being respectively along said outer flow path, in between adjacent ones of said transverse plates, along said inner flow path, and out between other adjacent ones of said transverse plates.

9. The cell of claim 8 wherein each central electrode assembly includes a central rod-like member having telescoped thereon said first transverse plates, and tubular spacers on said rod-like member between adjacent ones of said first transverse plates, each of said spacers being generally transversely aligned with one of said second transverse plates.

10. The cell of claim 8 wherein each outer electrode assembly includes rings closely fitting the respective housing, said rings being alternated with said second transverse plates and serving both as spacers for said second electrical plates and as conductors.

11. The cell of claim 9 wherein each outer electrode assembly includes rings closely fitting the respective housing, said rings being alternated with said second transverse plates and serving both as spacers for said second electrical plates and as conductors.

References Cited

UNITED STATES PATENTS

| | | | |
|---|---|---|---|
| 744,171 | 11/1903 | Davis and Perrett | 204—269 X |
| 823,671 | 6/1906 | Dieterich | 204—149 |
| 831,434 | 9/1906 | Hinkson | 204—269 X |
| 913,827 | 3/1909 | Korten | 204—150 |
| 1,894,271 | 1/1933 | Hänsel et al. | 204—269 X |
| 2,044,888 | 6/1936 | Overdick et al. | 204—269 X |

JOHN H. MACK, Primary Examiner

A. C. PRESCOTT, Assistant Examiner

U.S. Cl. X.R.

204—149